US012212073B2

(12) United States Patent
Ryu et al.

(10) Patent No.: US 12,212,073 B2
(45) Date of Patent: Jan. 28, 2025

(54) UWB ANTENNA MODULE

(71) Applicant: AMOSENSE CO.,LTD, Cheonan-si (KR)

(72) Inventors: Kyung Hyun Ryu, Seoul (KR); Hyung Il Baek, Yongin-si (KR); Yun Sik Seo, Suwon-si (KR); Jeong Geun Heo, Seoul (KR); Se Ho Lee, Seoul (KR); Hyun Joo Park, Seoul (KR); Seung Yeob Yi, Suwon-si (KR); Jae Il Park, Hwaseong-si (KR); Hong Dae Jung, Suwon-si (KR)

(73) Assignee: AMOSENSE CO.,LTD, Cheonan-si (KR)

( * ) Notice: Subject to any disclaimer, the term of this patent is extended or adjusted under 35 U.S.C. 154(b) by 175 days.

(21) Appl. No.: 17/626,455

(22) PCT Filed: Jul. 10, 2020

(86) PCT No.: PCT/KR2020/009135
§ 371 (c)(1),
(2) Date: Jan. 11, 2022

(87) PCT Pub. No.: WO2021/010685
PCT Pub. Date: Jan. 21, 2021

(65) Prior Publication Data

US 2022/0247071 A1 Aug. 4, 2022

(30) Foreign Application Priority Data

Jul. 12, 2019 (KR) ........................ 10-2019-0084705

(51) Int. Cl.
*H01Q 5/25* (2015.01)
*H01Q 1/22* (2006.01)
(Continued)

(52) U.S. Cl.
CPC ........... *H01Q 3/247* (2013.01); *H01Q 1/2283* (2013.01); *H01Q 1/243* (2013.01); *H01Q 21/30* (2013.01)

(58) Field of Classification Search
CPC ...... H01Q 3/247; H01Q 1/2283; H01Q 1/243; H01Q 21/30; H01Q 1/38; H01Q 5/25;
(Continued)

(56) References Cited

U.S. PATENT DOCUMENTS 9,337,526 B2 5/2016 Hong et al.
9,793,973 B2 10/2017 Kim et al.
(Continued)

FOREIGN PATENT DOCUMENTS

CN 1742407 A 3/2006
CN 109075457 A 12/2018
(Continued)

OTHER PUBLICATIONS

KR Office Action dated Apr. 30, 2021 as received in Application No. 10-2020-0085578.
(Continued)

*Primary Examiner* — Hai V Tran
*Assistant Examiner* — Bamidele A Immanuel
(74) *Attorney, Agent, or Firm* — Maschoff Brennan

(57) ABSTRACT

Disclosed is a UWB antenna module arranged in the lateral direction of a portable terminal so as to prevent deterioration of communication performance while minimizing a mounting space. The disclosed UWB antenna module comprises: a planar base substrate; a plurality of radiation patterns arranged on the upper surface of the base substrate, and arranged so as to be spaced from each other; a switching element arranged on the lower surface of the base substrate and connected to the plurality of radiation patterns; and a communication chipset arranged to be spaced from the
(Continued)

switching element on the lower surface of the base substrate, and connected to one of the plurality of radiation patterns through a switching operation of the switching element.

7 Claims, 13 Drawing Sheets

(51) Int. Cl.
*H01Q 1/24* (2006.01)
*H01Q 3/24* (2006.01)
*H01Q 21/30* (2006.01)

(58) Field of Classification Search
CPC ........ H01Q 21/08; H01Q 23/00; H01Q 25/00; H01Q 1/242; H01Q 1/50
See application file for complete search history.

(56) References Cited

U.S. PATENT DOCUMENTS

| | | | | |
|---|---|---|---|---|
| 10,389,007 | B1 * | 8/2019 | Choi | H01Q 21/08 |
| 10,840,583 | B2 | 11/2020 | Lee et al. | |
| 2004/0119654 | A1 * | 6/2004 | Koyama | H01Q 1/526 343/702 |
| 2006/0071870 | A1 * | 4/2006 | Saito | H01Q 11/06 343/700 MS |
| 2009/0143040 | A1 * | 6/2009 | Man | H01Q 1/245 29/601 |
| 2011/0149530 | A1 * | 6/2011 | Hwang | H05K 1/0263 361/748 |
| 2011/0248798 | A1 * | 10/2011 | Alexopoulos | H01Q 15/0093 333/204 |
| 2013/0141284 | A1 * | 6/2013 | Jeong | H01Q 1/2283 343/700 MS |
| 2017/0025749 | A1 * | 1/2017 | Frye | H01Q 21/0025 |
| 2018/0084637 | A1 * | 3/2018 | Ueda | H05K 1/0219 |
| 2019/0104212 | A1 * | 4/2019 | Lee | H01Q 9/0435 |
| 2019/0148839 | A1 * | 5/2019 | Lin | H01Q 21/30 343/700 R |
| 2019/0165461 | A1 * | 5/2019 | Shiozaki | H01Q 21/08 |
| 2019/0199399 | A1 * | 6/2019 | Vo | H04B 1/71637 |
| 2019/0207323 | A1 * | 7/2019 | Joung | H01Q 9/0407 |
| 2019/0288385 | A1 * | 9/2019 | Shimada | H01Q 1/48 |
| 2019/0296436 | A1 * | 9/2019 | Desclos | H01Q 5/335 |
| 2019/0327834 | A1 * | 10/2019 | Kim | H01Q 1/245 |
| 2019/0372199 | A1 * | 12/2019 | Haridas | H01Q 3/30 |
| 2020/0059010 | A1 * | 2/2020 | Yang | H01Q 1/48 |
| 2020/0067198 | A1 * | 2/2020 | Hunziker | H01L 24/20 |
| 2020/0161749 | A1 * | 5/2020 | Onaka | H01Q 21/24 |
| 2020/0194886 | A1 * | 6/2020 | Pu | H01Q 21/064 |
| 2020/0220572 | A1 * | 7/2020 | Kwon | H04M 1/026 |
| 2021/0075091 | A1 * | 3/2021 | Lee | H01Q 9/0407 |

FOREIGN PATENT DOCUMENTS

| | | | | |
|---|---|---|---|---|
| JP | 11-234038 | A | 8/1999 | |
| JP | 3010208 | B2 * | 2/2000 | H01Q 13/08 |
| JP | 3084398 | B2 * | 9/2000 | H01Q 21/06 |
| JP | 2019-097118 | A | 6/2019 | |
| KR | 10-2011-0060765 | A | 6/2011 | |
| KR | 10-2013-0042909 | A | 4/2013 | |
| KR | 10-2013-0062717 | A | 6/2013 | |
| KR | 10-2013-0064254 | A | 6/2013 | |
| KR | 10-2016-0031860 | A | 3/2016 | |
| KR | 10-2019-0061161 | A | 6/2019 | |
| KR | 10-2019-0140209 | A | 12/2019 | |

OTHER PUBLICATIONS

KR Decision to Grant Dated Oct. 21, 2021 as received in Application No. 10-2020-0085578.

CN Office Action dated Aug. 22, 2024 in application 202080050698.1.

* cited by examiner

[FIG. 1]
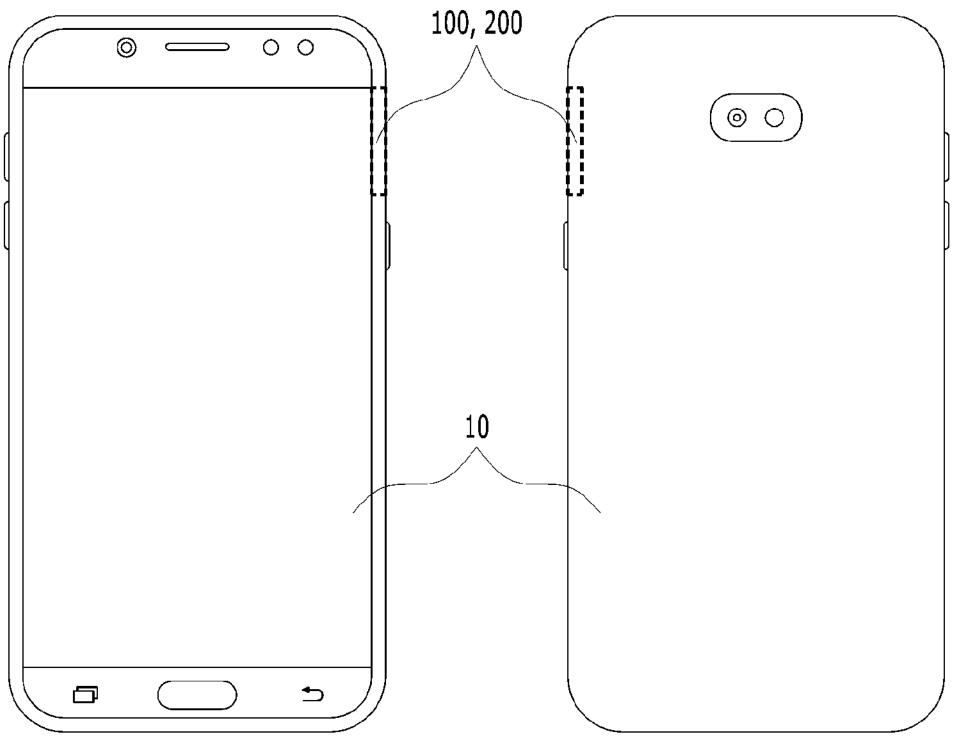

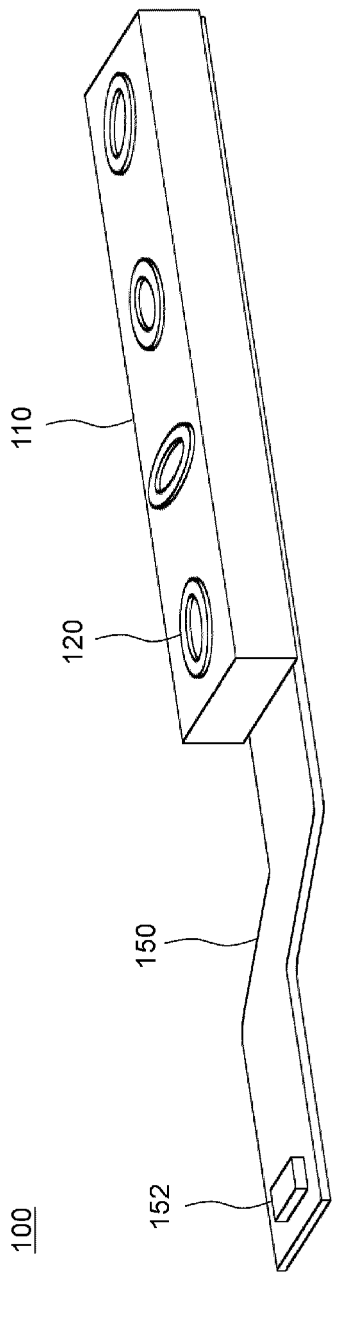
[Fig. 2]

[Fig. 3]
100
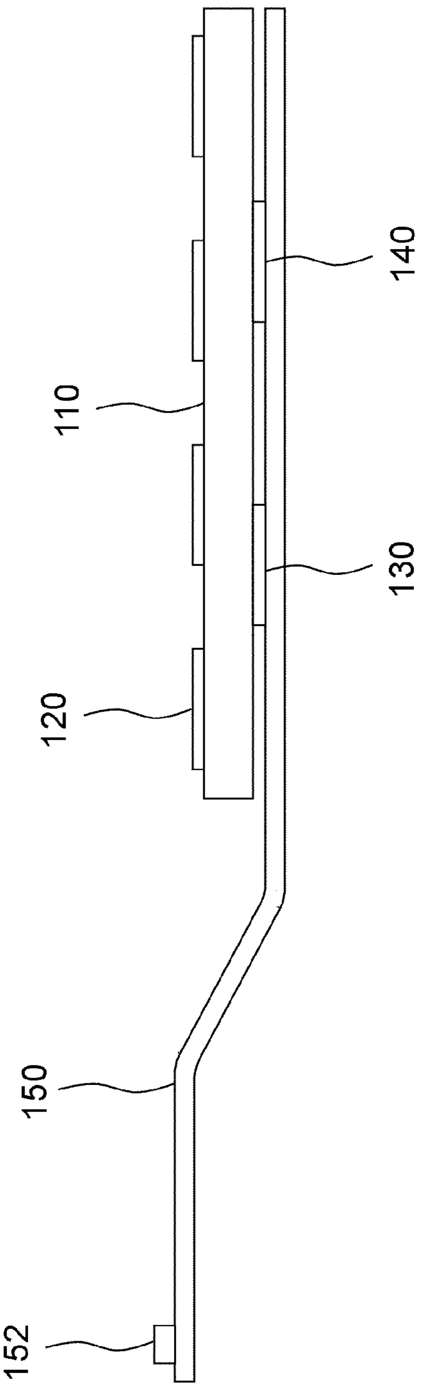

[FIG. 4]
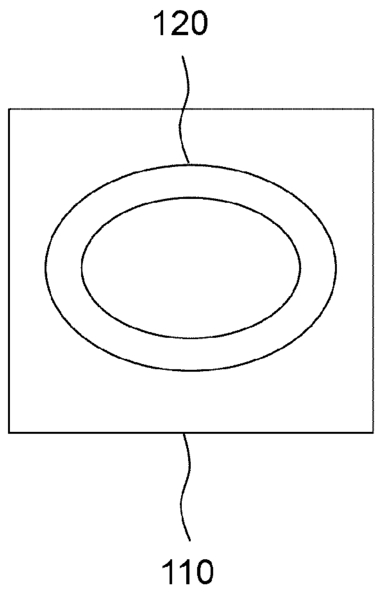
[FIG. 5]
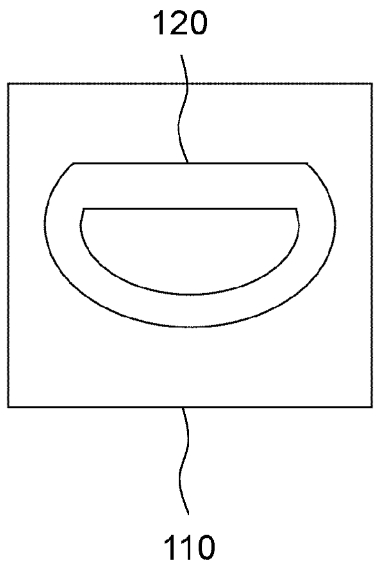

[FIG. 6]
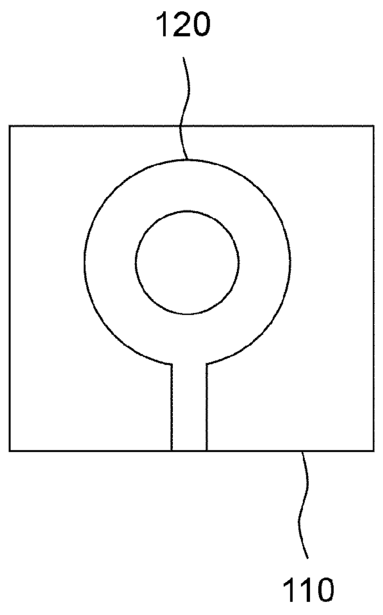
[FIG. 7]
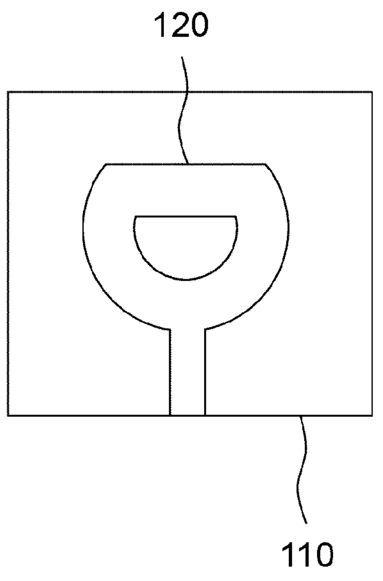

[FIG. 8]
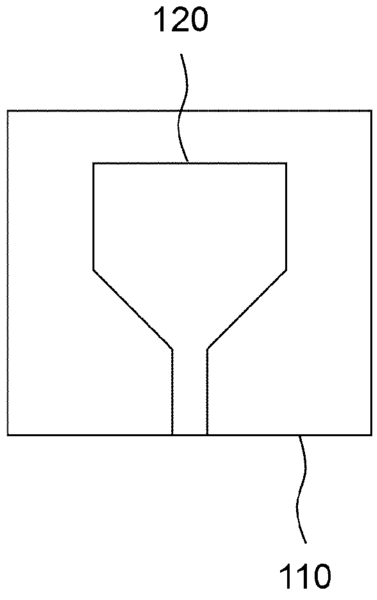
[FIG. 9]
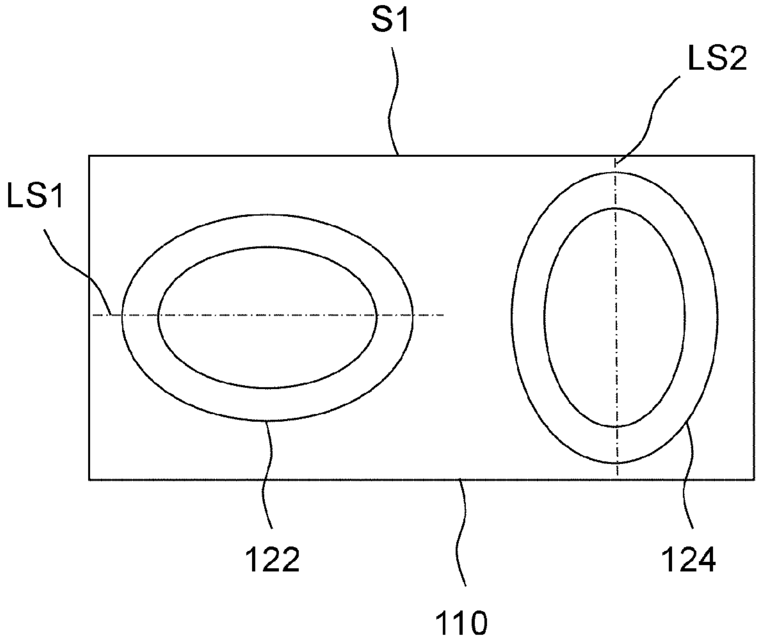

[FIG. 10]
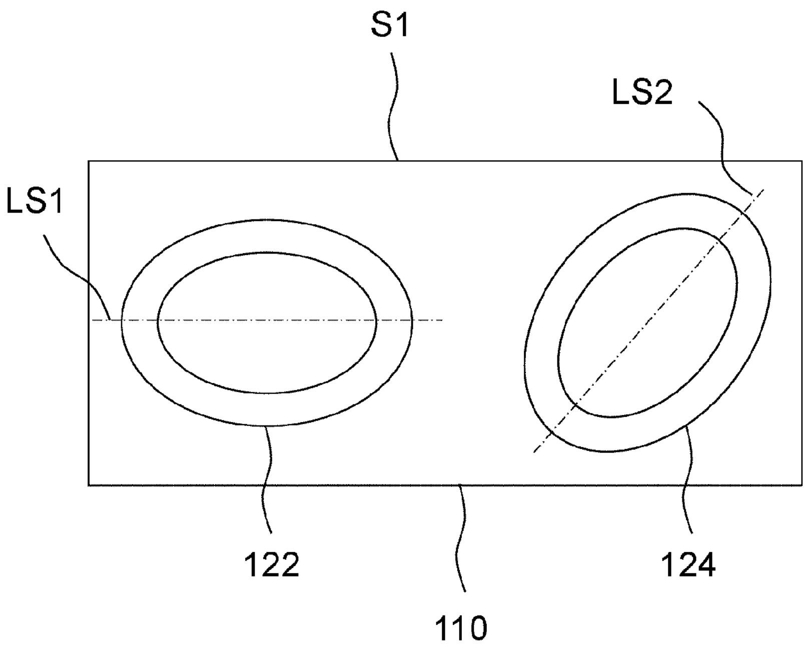
[FIG. 11]
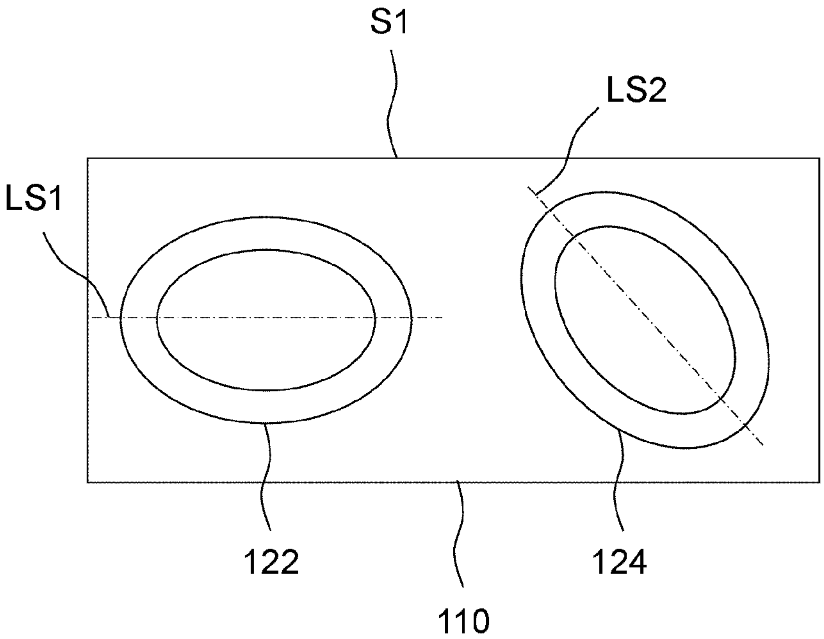

[FIG. 12]
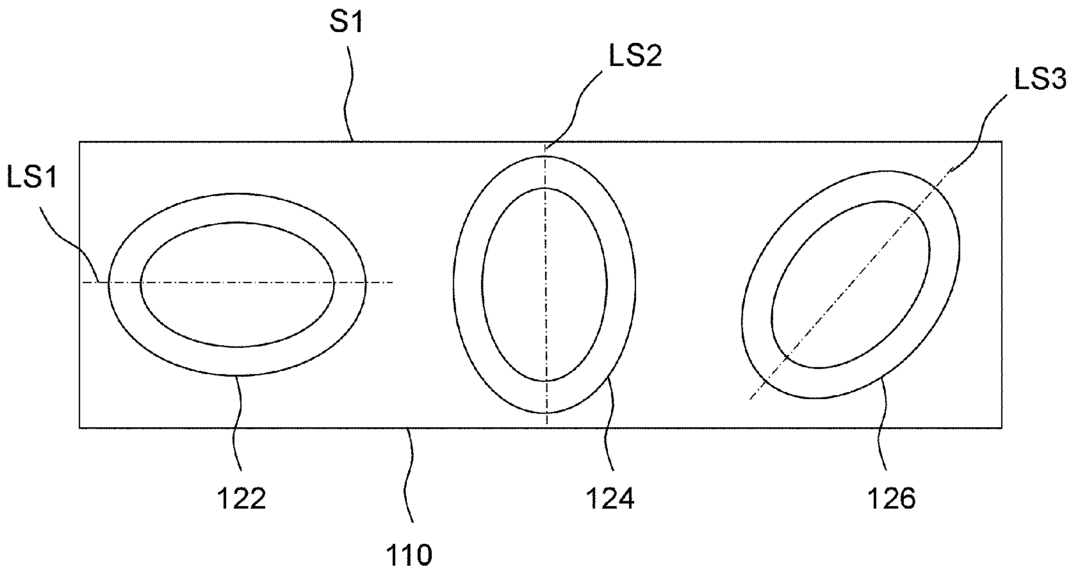
[FIG. 13]
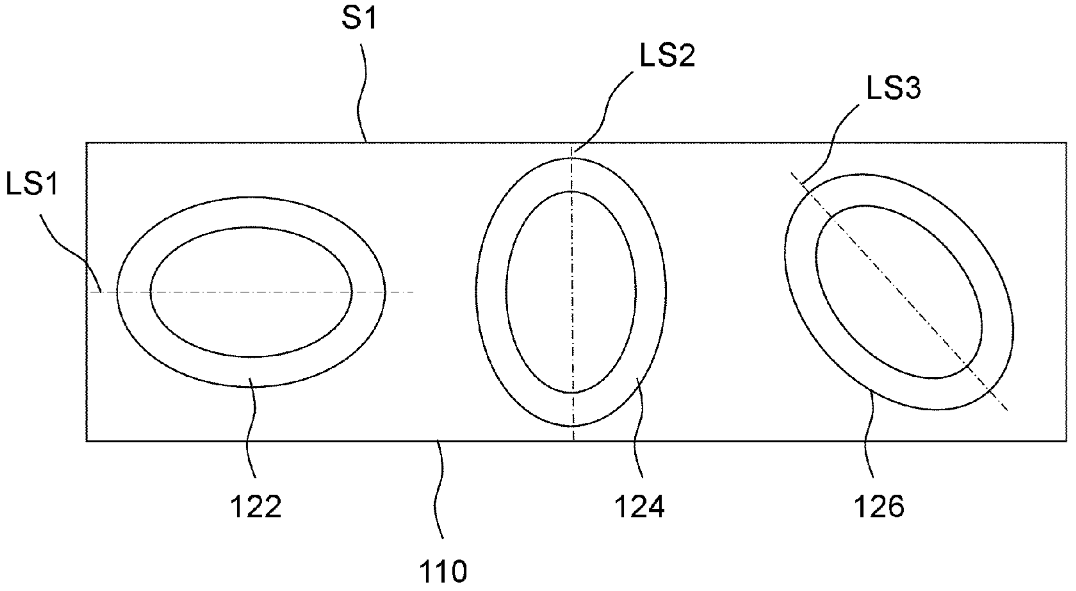

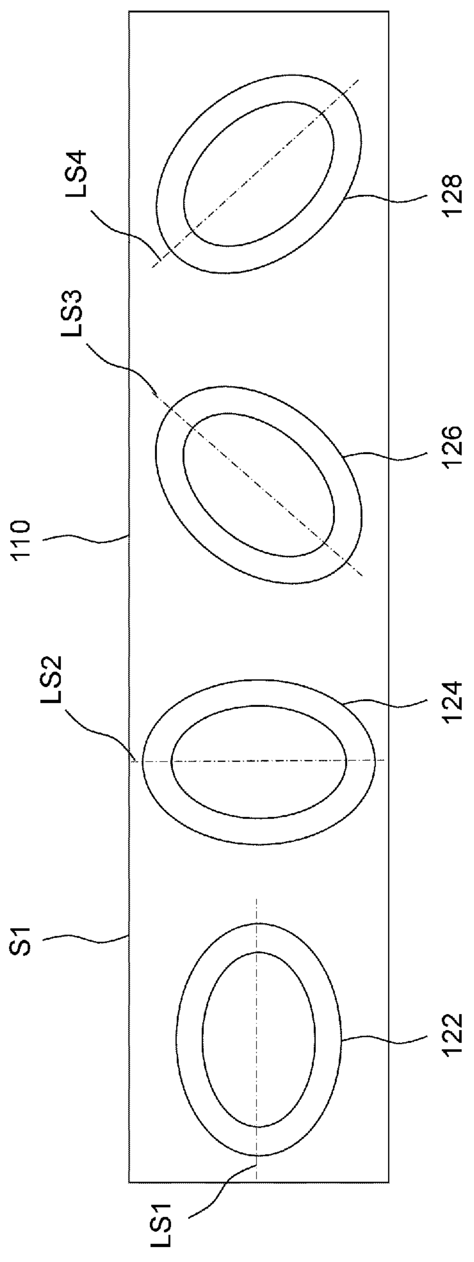
[Fig. 14]

[Fig. 15]
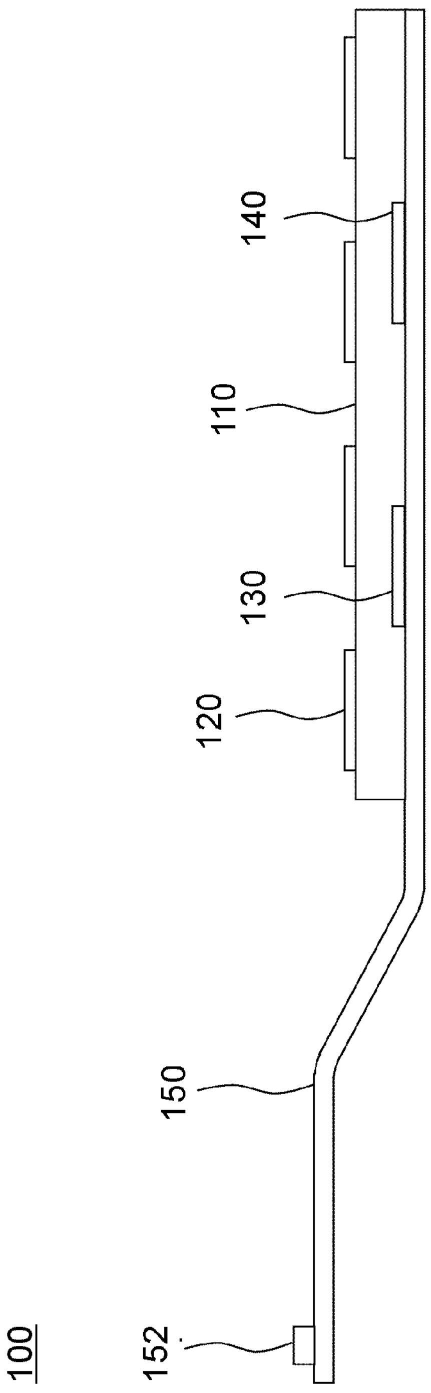

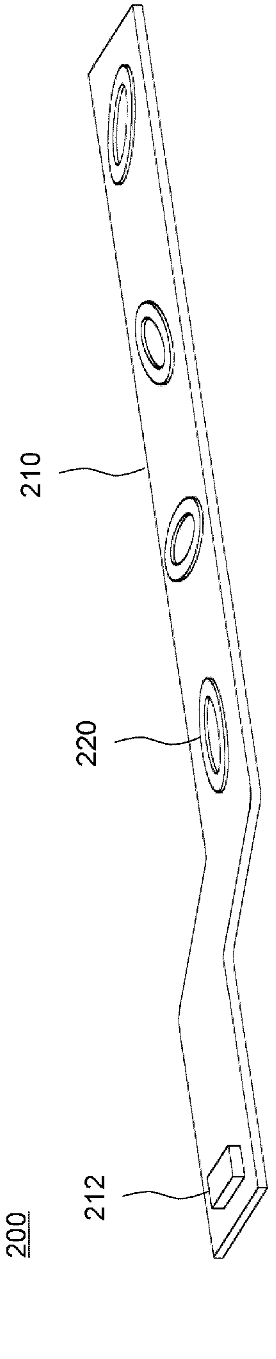
[Fig. 16]

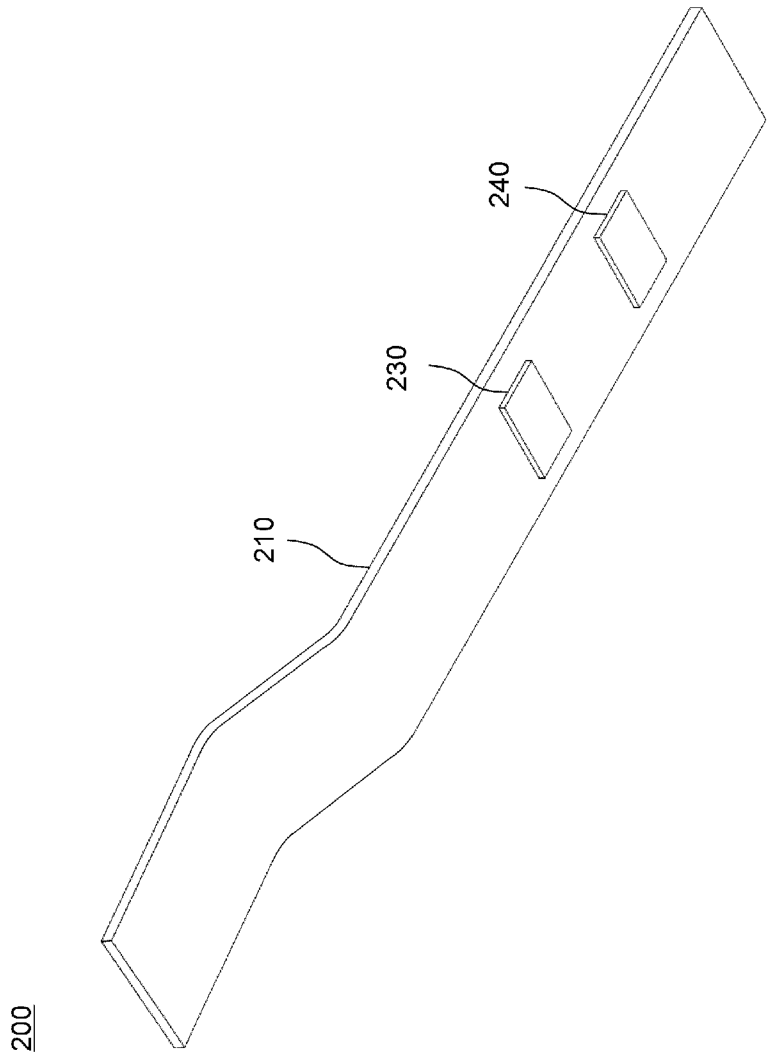
[Fig. 17]

[Fig. 18]
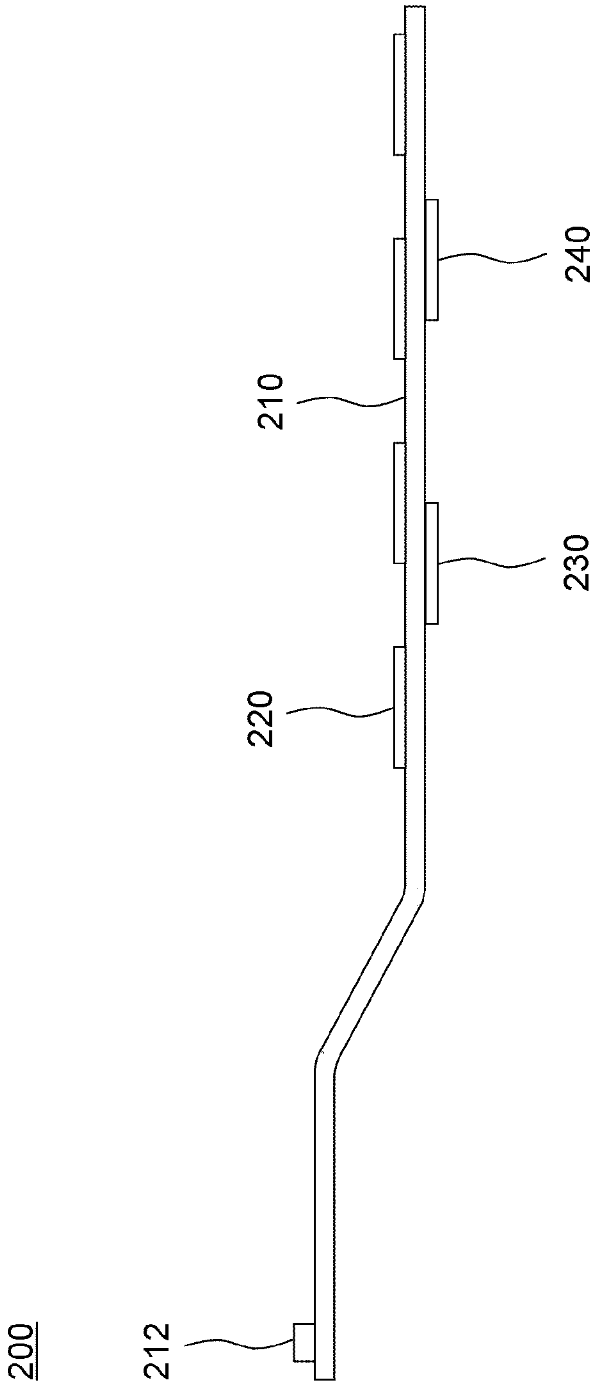

UWB ANTENNA MODULE

TECHNICAL FIELD

The present disclosure relates to a UWB antenna module, and more specifically, to a UWB antenna module mounted in a portable terminal.

BACKGROUND ART

Recently, a technology for replacing a smart key of a vehicle with a portable terminal is being studied. In order for the portable terminal to replace the smart key, a UWB antenna module used for indoor positioning is required.

Since a plurality of antennas are already mounted in the portable terminal, there is an insufficient space for mounting the UWB antenna module. The portable terminal has the thickness of about 7 mm to 9 mm and it is difficult to mount an antenna with a thickness exceeding 1 mm therein.

In addition, if the UWB antenna module is disposed in a direction of a rear cover in the portable terminal, there is a problem in that communication performance is lowered by metal substrates such as the rear cover.

In addition, since a general UWB antenna module has the UWB antenna installed in the direction of the rear cover in the portable terminal, and a communication chipset for processing UWB signals installed on a circuit board of the portable terminal, there is a problem in that a signal loss occurs in a process of delivering signals between the UWB antenna and the communication chipset.

SUMMARY OF INVENTION

Technical Problem

The present disclosure is proposed to solve the above problems, and an object of the present disclosure is to provide a UWB antenna module disposed in a lateral direction of a portable terminal to prevent communication performance from being lowered while minimizing a mounting space.

In addition, another object of the present disclosure is to provide a UWB antenna module in which a UWB radiation pattern and a chipset are formed on one base substrate, thereby minimizing signal loss in a process of delivering signals.

Solution to Problem

To achieve the objects, a UWB antenna module according to an exemplary embodiment of the present disclosure includes a planar base substrate; a plurality of radiation patterns disposed on an upper surface of the base substrate, and disposed to be spaced apart from each other; a switching element disposed on a lower surface of the base substrate, and connected to the plurality of radiation patterns; and a communication chipset disposed to be spaced apart from the switching element on the lower surface of the base substrate, and configured to be connected to one of the plurality of radiation patterns through a switching operation of the switching element.

The UWB antenna module according to the exemplary embodiment of the present disclosure can further include a connector disposed on one of the upper and lower surfaces of the base substrate, and connected to the communication chipset.

Each long axis of the plurality of radiation patterns can be disposed in different directions from each other, and an angle between a long axis of the radiation pattern and a first side of a base substrate can be different from an angle between a long axis of another radiation pattern and the first side of the base substrate. At this time, the plurality of radiation patterns can be formed in an elliptical shape having a long axis and a short axis.

The switching element can be connected to the plurality of radiation patterns, and can switch one of the plurality of radiation patterns to the communication chipset.

The UWB antenna module according to the exemplary embodiment of the present disclosure can further include a flexible cable disposed on a lower portion of the base substrate to have one side extending to the outside of the base substrate, and connected to the communication chipset, and a connector disposed in a region of the entire region of the flexible cable, which extends to the outside of the base substrate.

The communication chipset can be inserted into the base substrate, and can have one surface exposed to the lower surface of the base substrate.

Advantageous Effects of Invention

According to the present disclosure, it is possible to dispose the UWB antenna module in the lateral direction of the portable terminal, thereby preventing the communication performance from being lowered due to the metal substrate of the portable terminal while minimizing the mounting space.

In addition, the UWB antenna module can form the UWB radiation pattern and the chipset on one base substrate, thereby minimizing the path for delivering the signals to minimize the signal loss that occurs in the process of delivering the signals.

BRIEF DESCRIPTION OF DRAWINGS

FIG. 1 is a diagram for explaining a portable terminal in which a UWB antenna module according to an exemplary embodiment of the present disclosure is mounted.

FIG. 2 is a perspective diagram for explaining the UWB antenna module according to the exemplary embodiment of the present disclosure.

FIG. 3 is a side diagram for explaining the UWB antenna module according to the exemplary embodiment of the present disclosure.

FIGS. 4 to 8 are diagrams for explaining various shapes of a radiation pattern according to the present disclosure.

FIGS. 9 to 14 are diagrams for explaining various layout structures of a plurality of radiation patterns according to the present disclosure.

FIG. 15 is a diagram for explaining a modified example of the UWB antenna module according to the exemplary embodiment of the present disclosure.

FIG. 16 is a perspective diagram for explaining a UWB antenna module according to another exemplary embodiment of the present disclosure.

FIG. 17 is a bottom side diagram for explaining the UWB antenna module according to another exemplary embodiment of the present disclosure.

FIG. 18 is a side diagram for explaining the UWB antenna module according to another exemplary embodiment of the present disclosure.

DESCRIPTION OF EMBODIMENTS

Hereinafter, the most preferred exemplary embodiments of the present disclosure will be described with reference to the accompanying drawings in order to specifically describe the present disclosure such that those skilled in the art to which the present disclosure pertains may easily carry out the technical spirit of the present disclosure. First, in adding reference numerals to the components of each drawing, it should be noted that the same components have the same reference numerals, if possible, even if they are illustrated in different drawings. In addition, in describing the present disclosure, when it is determined that the detailed description of the related publicly-known configuration or function may obscure the subject matter of the present disclosure, the detailed description thereof will be omitted.

Referring to FIG. 1, ultra wide band (UWB) antenna modules 100, 200 according to an exemplary embodiment of the present disclosure are disposed in a portable terminal 10, and disposed in a lateral direction of the portable terminal 10. In other words, the UWB antenna modules 100, 200 are disposed in the portable terminal 10, and for example, disposed adjacent to a right surface of the portable terminal 10 based on the drawing. At this time, while FIG. 1 shows that the UWB antenna modules 100, 200 are disposed adjacent to the right surface of the portable terminal 10, they are not limited thereto and can also be disposed adjacent to the left surface of the portable terminal 10 based on the drawing.

In general, a user uses the portable terminal 10 in a state of holding a rear surface of the portable terminal 10 and a lower portion of a side surface thereof based on the drawing. When the UWB antenna modules 100, 200 are disposed to be tilted downward to the side surface of the portable terminal 10, a signal loss due to the user's body occurs, thereby lowering communication performance of the UWB antenna modules 100, 200.

Therefore, the UWB antenna modules 100, 200 are disposed on the side surface of the portable terminal 10, and are disposed to be tilted upward from the portable terminal 10. Here, for example, the downward is a direction in which a microphone for voice call is disposed, and an upward is a direction in which a speaker for voice call is disposed.

Referring to FIGS. 2 and 3, the UWB antenna module 100 according to a first exemplary embodiment of the present disclosure is configured to include a base substrate 110, a radiation pattern 120, a switching element 130, a communication chipset 140, and a flexible cable 150.

The base substrate 110 is formed of a planar substrate with a predetermined area. Since the UWB antenna module 100 is disposed on the side surface of the portable terminal 10, the base substrate 110 is formed of the planar substrate with a rectangular shape. At this time, the base substrate 110 is, for example, formed of the planar substrate such as a ceramic substrate or an FR4 substrate.

The radiation pattern 120 is formed on an upper surface of the base substrate 110. The radiation pattern 120 is made of a metal material such as copper. At this time, since the UWB antenna module 100 uses an angle of arrival (AOA) positioning method to increase positioning accuracy, a plurality of radiation patterns 120 are configured.

The radiation pattern 120 is formed in a shape having a long axis and a short axis. The radiation pattern 120 can be formed in various shapes according to the applied portable terminal 10, an installation area, etc.

Referring to FIG. 4, the radiation pattern 120 is formed in an elliptical shape having different lengths of the long axis and the short axis. The radiation pattern 120 is formed in a frame shape with a hole formed therein.

Referring to FIG. 5, the radiation pattern 120 can be formed in a deformed elliptical shape in which one side parallel to the long axis has a linear shape. In other words, the radiation pattern 120 can be formed so that an upper portion of the ellipse is linearly formed based on the drawing and is parallel to the long axis. The radiation pattern 120 can be formed in an elliptical shape having a linear lower portion based on the drawing, and also formed to be parallel to the long axis.

Referring to FIG. 6, the radiation pattern 120 can also be formed in a shape in which a pattern of a circular frame shape in which the lengths of the long axis and the short axis are the same and a pattern of a linear shape are combined. In other words, the radiation pattern 120 is configured to include the circular frame pattern and the linear pattern, in which the circular frame pattern can be disposed to be located closer to the upper portion than the lower portion of the base substrate 110 based on the drawing, and one end of the linear pattern can be connected to the circular frame pattern and the other end of the linear pattern can be formed to be located on the same line as the lower side of the base substrate.

Referring to FIG. 7, the radiation pattern 120 can also be formed in a modified circular shape in which a part of the pattern of the circular frame shape is a linear shape. In other words, the radiation pattern 120 can be formed so that the circular upper portion is formed in the linear shape based on the drawing and is parallel to an upper side of the base substrate 110. At this time, the linear pattern can be disposed to be perpendicular to the upper side (or lower side) of the base substrate 110.

Referring to FIG. 8, the radiation pattern 120 can also be formed in a shape in which a polygonal pattern having a plurality of sides and a plurality of vertices and the linear pattern are combined. In other words, the radiation pattern is configured to include a pentagonal pattern and a linear pattern, in which the pentagonal pattern can be disposed to be located closer to the upper portion than the lower portion of the base substrate 110 based on the drawing, and one end of the linear pattern can be connected to the pentagonal pattern and the other end of the linear pattern can be formed to be located on the same line as the lower side of the base substrate.

The plurality of radiation patterns 120 are formed in the same shape, and disposed so that the axes face different directions. In other words, the long axis of the radiation pattern 120 is disposed to face a different direction from the long axis of the other radiation pattern 120. An angle between the long axis of the radiation pattern 120 and one side of the base substrate is different from an angle between the long axis of the other radiation pattern 120 and one side of the base substrate.

Referring to FIG. 9, the UWB antenna module 100 can be configured to include a first radiation pattern 122 and a second radiation pattern 124 to receive signals in the XY direction. At this time, the first radiation pattern 122 and the second radiation pattern 124 are formed to have different angles (different directions).

The first radiation pattern 122 and the second radiation pattern 124 are formed in an elliptical shape, in which the first radiation pattern 122 is disposed so that a long axis LS1 is parallel to a first side S1 of the base substrate 110 and the second radiation pattern 124 is disposed so that a long axis LS2 is perpendicular to the first side S1 of the base substrate 110. Here, for example, the first side S1 is one of two long sides having a long length among four sides of the base substrate 110.

For another example, referring to FIG. 10, the first radiation pattern 122 and the second radiation pattern 124 are formed in an elliptical shape, in which the first radiation pattern 122 is disposed so that the long axis LS1 is parallel to the first side S1 of the base substrate 110 and the second radiation pattern 124 is disposed so that the long axis LS2 has an angle of about 45° with the first side S1 of the base substrate 110.

For still another example, referring to FIG. 11, the first radiation pattern 122 and the second radiation pattern 124 are formed in an elliptical shape, in which the first radiation pattern 122 is disposed so that the long axis LS1 is parallel to the first side S1 of the base substrate 110 and the second radiation pattern 124 is disposed so that the long axis LS2 has an angle of about 135° with the first side S1 of the base substrate 110.

The UWB antenna module 100 can be configured to include the first radiation pattern 122, the second radiation pattern 124, and a third radiation pattern 126 to receive signals in a 3D (XYZ) direction. At this time, the first radiation pattern 122, the second radiation pattern 124, and the third radiation pattern 126 are formed to have different angles (different directions).

For example, referring to FIG. 12, the first radiation pattern 122, the second radiation pattern 124, and the third radiation pattern 126 are formed in an elliptical shape, in which the first radiation pattern 122 is disposed so that the long axis LS1 is parallel to the first side S1 of the base substrate 110, the second radiation pattern 124 is disposed so that the long axis LS2 is perpendicular to the first side S1 of the base substrate 110, and the third radiation pattern 126 is disposed so that a long axis LS3 forms an angle of about 45° with the first side S1 of the base substrate 110.

For another example, referring to FIG. 13, the first radiation pattern 122 and the second radiation pattern 124 are formed in an elliptical shape, in which the first radiation pattern 122 is disposed so that the long axis LS1 is parallel to the first side S1 of the base substrate 110, the second radiation pattern 124 is disposed so that the long axis LS2 is perpendicular to the first side S1 of the base substrate 110, and the third radiation pattern 126 is disposed so that the long axis LS3 forms an angle of about 135° with the first side S1 of the base substrate 110.

Meanwhile, referring to FIG. 14, the UWB antenna module 100 can also be configured to include the first radiation pattern 122, the second radiation pattern 124, the third radiation pattern 126, and a fourth radiation pattern 128. At this time, the first radiation pattern 122, the second radiation pattern 124, the third radiation pattern 126, and the fourth radiation pattern 128 are formed to have different angles (different directions). In other words, the first radiation pattern 122, the second radiation pattern 124, the third radiation pattern 126, and the fourth radiation pattern 128 are formed in an elliptical shape. The first radiation pattern 122 is disposed so that the long axis LS1 is parallel to the first side S1 of the base substrate 110. The second radiation pattern 124 is disposed so that the long axis LS2 is perpendicular to the first side S1 of the base substrate 110. The third radiation pattern 126 is disposed so that the long axis LS3 forms an angle of about 45° with the first side S1 of the base substrate 110. The fourth radiation pattern 128 is disposed so that a long axis LS4 forms an angle of about 135° with the first side S1 of the base substrate 110.

Meanwhile, while FIGS. 9 to 14 show the installation direction of the radiation pattern based on the angle between the long axis of the elliptical shape and one side of the base substrate 110, the installation direction is not limited thereto and can also be classified based on the location where a specific portion (e.g., linear pattern) of the radiation pattern is disposed.

Meanwhile, the UWB antenna module 100 can be configured to include only one radiation pattern 120 if the communication chipset 140 processes a UWB signal in a time of flight (RoF) method.

The switching element 130 is disposed on the lower surface of the base substrate 110. The switching element 130 is connected to the plurality of radiation patterns 120 formed on the upper surface of the base substrate 110. At this time, the switching element 130 is connected to the plurality of radiation patterns 120 through a via hole (not shown) penetrating the base substrate 110. If the base substrate 110 is composed of a plurality of layers, the via hole can also be composed of connection patterns (not shown) formed on the layers constituting the base substrate 110. Here, the switching element 130 can also be omitted from the configuration if one radiation pattern 120 is configured.

The switching element 130 switches one of the plurality of radiation patterns 120 to the communication chipset 140. In other words, the plurality of radiation patterns 120 are connected to the switching element 130 through one or more via holes (not shown) penetrating the base substrate 110 or connection patterns (not shown), and the switching element 130 switches one of the plurality of radiation patterns 120 to the communication chipset 140. At this time, the switching element 130 can sequentially switch the plurality of radiation patterns 120 to the communication chipset 140.

The communication chipset 140 is disposed on the lower surface of the base substrate 110. The communication chipset 140 is disposed to be spaced apart from the switching element 130 by a predetermined distance. The communication chipset 140 is connected to the switching element through a signal line formed on the base substrate 110. At this time, the communication chipset 140 is composed of a UWB communication element configured to process the UWB signal.

Referring to FIG. 15, the switching element 130 and the communication chipset 140 can be disposed in the base substrate 110. The switching element 130 and the communication chipset 140 are disposed so that one surface is exposed from the inside of the base substrate 110 to the lower surface of the base substrate 110. At this time, the switching element 130 and the communication chipset 140 can also be configured to be accommodated in the base substrate 110, and electrically connected to a terminal formed on the lower surface of the base substrate 110.

The flexible cable 150 is disposed on the lower surface of the base substrate 110 to connect the communication chipset 140 and the circuit board of the portable terminal 10. In other words, the flexible cable 150 is formed of a planar flexible substrate. The flexible cable 150 is disposed on the lower surface of the base substrate 110 and electrically connected to the communication chipset 140. The flexible cable 150 has one side extending to the outside of the base substrate 110.

A connector 152 is disposed on one side of the flexible cable 150. At this time, the connector 152 is disposed in a region of the flexible cable 150, which extends to the outside of the base substrate 110, and disposed outside the base substrate 110. Here, for example, the flexible cable 150 is formed of a flexible printed circuit board on which a wiring for electrically connecting the communication chipset 140 and the circuit board of the mobile terminal 10 is formed.

Meanwhile, referring to FIGS. 16 to 18, the UWB antenna module 200 according to a second exemplary embodiment of the present disclosure can also be configured in the form of a printed circuit board (PCB) or a flexible printed circuit board (FPCB).

To this end, the UWB antenna module 200 is configured to include a base substrate 210, a plurality of radiation patterns 220, a switching element 230, and a communication chipset 240.

The base substrate 210 is formed of a flexible substrate such as POLYIMIDE (PI), POLYESTER (PET), or GLASS EPDXY (GE). At this time, a connector 212 connected to the circuit board of the portable terminal 10 is formed on one side end of the base substrate 210.

The plurality of radiation patterns 220 are disposed on the upper surface of the base substrate 210. At this time, since the shape, number, layout structure, etc. of the radiation pattern 220 are the same as those of the radiation pattern 220 of the aforementioned first exemplary embodiment, a detailed description thereof will be omitted.

The switching element 230 is disposed on the lower surface of the base substrate 210. The switching element 230 is connected to the plurality of radiation patterns 220 formed on the upper surface of the base substrate 210. At this time, the switching element 230 is connected to the plurality of radiation patterns 220 through a via hole penetrating the base substrate 210. Here, the switching element 230 can also be omitted from the configuration if one radiation pattern 220 is configured.

The switching element 230 switches one of the plurality of radiation patterns 220 to the communication chipset 240. In other words, each of the plurality of radiation patterns 220 is connected to the switching element 230 through one or more via holes penetrating the base substrate 210. The switching element 230 switches one of the plurality of radiation patterns 220 to the communication chipset 240. At this time, the switching element 230 sequentially switches the plurality of radiation patterns 220 to the communication chipset 240.

The communication chipset 240 is disposed on the lower surface of the base substrate 210. The communication chipset 240 is disposed to be spaced apart from the switching element 230 by a predetermined distance. The communication chipset 240 is connected to the switching element through a signal line formed on the base substrate 210. At this time, the communication chipset 240 is formed of the UWB communication chipset 240 configured to process UWB signals.

Although the preferred exemplary embodiments of the present disclosure have been described above, it is understood that the present disclosure may be modified in various forms, and those skilled in the art may carry out various modified examples and changed examples without departing from the scope of the claims of the present disclosure.

The invention claimed is:

1. A UWB antenna module comprising:
a planar base substrate;
a plurality of radiation patterns disposed on an upper surface of the base substrate, and disposed to be spaced apart from each other;
a switching element disposed on a lower surface of the base substrate, and connected to the plurality of radiation patterns; and
a communication chipset disposed to be spaced apart from the switching element on the lower surface of the base substrate, and configured to be connected to one of the plurality of radiation patterns through a switching operation of the switching element, wherein:
the plurality of radiation patterns includes a first radiation pattern, a second radiation pattern, a third radiation pattern, and a fourth radiation pattern,
a first long axis of the first radiation pattern is parallel to a first side of the base substrate,
a second long axis of the second radiation pattern is perpendicular to the first side of the base substrate,
a third long axis of the third radiation pattern forms an angle of about 45° with the first side of the base substrate,
a fourth long axis of the fourth radiation pattern forms an angle of about 135° with the first side of the base substrate, and
the respective long axes of each the plurality of radiation patterns are disposed in different directions and different angles from each other, and an angle between a long axis of a radiation pattern and a first side of the base substrate is different from angles between long axis of another radiation patterns and the first side of the base substrate.

2. The UWB antenna module of claim 1,
further comprising: a connector disposed on one of the upper and lower surfaces of the base substrate, and connected to the communication chipset.

3. The UWB antenna module of claim 1,
wherein the plurality of radiation patterns are formed in an elliptical shape having a long axis and a short axis.

4. The UWB antenna module of claim 1,
wherein the switching element is connected to the plurality of radiation patterns, and switches one of the plurality of radiation patterns to the communication chipset.

5. The UWB antenna module of claim 1,
further comprising: a flexible cable disposed on a lower portion of the base substrate to have one side extending to the outside of the base substrate, and connected to the communication chipset.

6. The UWB antenna module of claim 5,
further comprising: a connector disposed in a region of the entire region of the flexible cable, which extends to the outside of the base substrate.

7. The UWB antenna module of claim 1,
wherein the communication chipset is inserted into the base substrate, and has one surface exposed to the lower surface of the base substrate.

* * * * *